(12) United States Patent
Athelogou et al.

(10) Patent No.: US 8,879,819 B2
(45) Date of Patent: Nov. 4, 2014

(54) GLEASON GRADING BY SEGMENTING AND COMBINING CO-REGISTERED IMAGES OF DIFFERENTLY STAINED TISSUE SLICES

(71) Applicant: Definiens AG, Munich (DE)

(72) Inventors: Maria Athelogou, Munich (DE); Thomas Kirchner, Munich (DE); Harald Hessel, Munich (DE); Gerd Binnig, Kottgeisering (DE)

(73) Assignee: Definiens AG, Munich (DE)

( * ) Notice: Subject to any disclaimer, the term of this patent is extended or adjusted under 35 U.S.C. 154(b) by 105 days.

(21) Appl. No.: 13/719,920

(22) Filed: Dec. 19, 2012

(65) Prior Publication Data

US 2014/0169654 A1    Jun. 19, 2014

(51) Int. Cl.
*G06K 9/00* (2006.01)
*G06T 7/00* (2006.01)

(52) U.S. Cl.
CPC .......... *G06K 9/00127* (2013.01); *G06T 7/0012* (2013.01); *G06T 7/0097* (2013.01); *G06T 2207/10056* (2013.01); *G06T 2207/30024* (2013.01); *G06T 2207/30081* (2013.01); *G06T 2207/30242* (2013.01)
USPC .......................... 382/133; 382/128; 382/257

(58) Field of Classification Search
CPC ............... G06T 7/0012; G06T 7/0083; G06T 2207/30004; G06T 7/0081; G06T 2207/30024; G06T 2207/10056; G06T 5/30; G06T 5/001; G06F 19/321; G06K 9/00124; G06K 9/56; G01N 15/1474
USPC ............. 382/128, 133, 257; 348/79; 359/362, 359/368; 324/309, 312; 345/428, 629
See application file for complete search history.

(56) References Cited

U.S. PATENT DOCUMENTS

| | | | | |
|---|---|---|---|---|
| 4,620,154 A | * | 10/1986 | Inouye | 324/309 |
| 8,139,831 B2 | | 3/2012 | Khamene et al. | 382/128 |
| 8,699,769 B2 | * | 4/2014 | Schoenmeyer et al. | 382/128 |
| 2008/0032328 A1 | | 2/2008 | Cline | 435/40.5 |
| 2010/0265267 A1 | | 10/2010 | Schaepe et al. | 345/619 |
| 2012/0226709 A1 | | 9/2012 | Bhargava et al. | 707/769 |

OTHER PUBLICATIONS

DiFranco et al., "Automated Gleason Scoring of Prostatic Histopathology Slides Using Multi-channel Co-occurrence Texture Features," University College Dublin, Ireland (no date) (6 pages).

(Continued)

*Primary Examiner* — Anh Do
(74) *Attorney, Agent, or Firm* — Imperium Patent Works; Darien K. Wallace

(57) ABSTRACT

An improved histopathological score is obtained by generating image objects from images of tissue containing stained epithelial cells. First objects are generated that correspond to basal cells stained with a first stain, such as p63. Second objects are generated that correspond to luminal cells stained with a second stain, such as CK18. If the same tissue is not stained with both stains, then the images of differently stained tissue are co-registered. Third objects are defined to include only those second objects that have more than a minimum separation from any first object. A scoring region includes the third objects, and the histopathological score is determined based on tissue that falls within the scoring region. For example, a Gleason score of prostate tissue is determined by classifying tissue patterns in the scoring region. Alternatively, a Gleason pattern is assigned by counting the number of third objects that possess a predetermined form.

25 Claims, 13 Drawing Sheets

(56) References Cited

OTHER PUBLICATIONS

Iczkowski et al., "Pseudolumen Size and Perimeter in Prostate Cancer: Correlation with Patient Outcome," University of Colorado, Aurora, CO May 7, 2011, Hindawi Publishing Corp., Prostate Cancer, vol. 2011 (5 pages).

Liu et al., "Correlated alterations in prostate basal cell layer and basement membrane," Int. J. Biol. Sci. 2009; 5(3):276-285 Feb. 27, 2009 (10 pages).

Stuart Schnitt, "Immunohistochemistry in Distinguishing Benign from Malignant Breast Epithelial Proliferations," Harvard Medical School, Boston, MA, 2007 College of American Pathologists pp. 39-52(21 pages).

Bostwick et al., "Atypical Adenomatous Hyperplasia of the Prostate: Morphologic criteria for its distinction from well-differentiated carcinoma", Mayo Clinic, Rochester, MN; Human Pathaology, vol. 24, No. 8, Aug. 1, 1993 XP026255131A.

International Search Report and Written Opinion dated Feb. 10, 2014 by the European Patent Office in the international patent application PCT/EP2013/072255 that claims priority to this application.

* cited by examiner 51 50
THIRD SECOND
OBJECTS OBJECTS

FIRST DIGITAL IMAGE  SECOND DIGITAL IMAGE

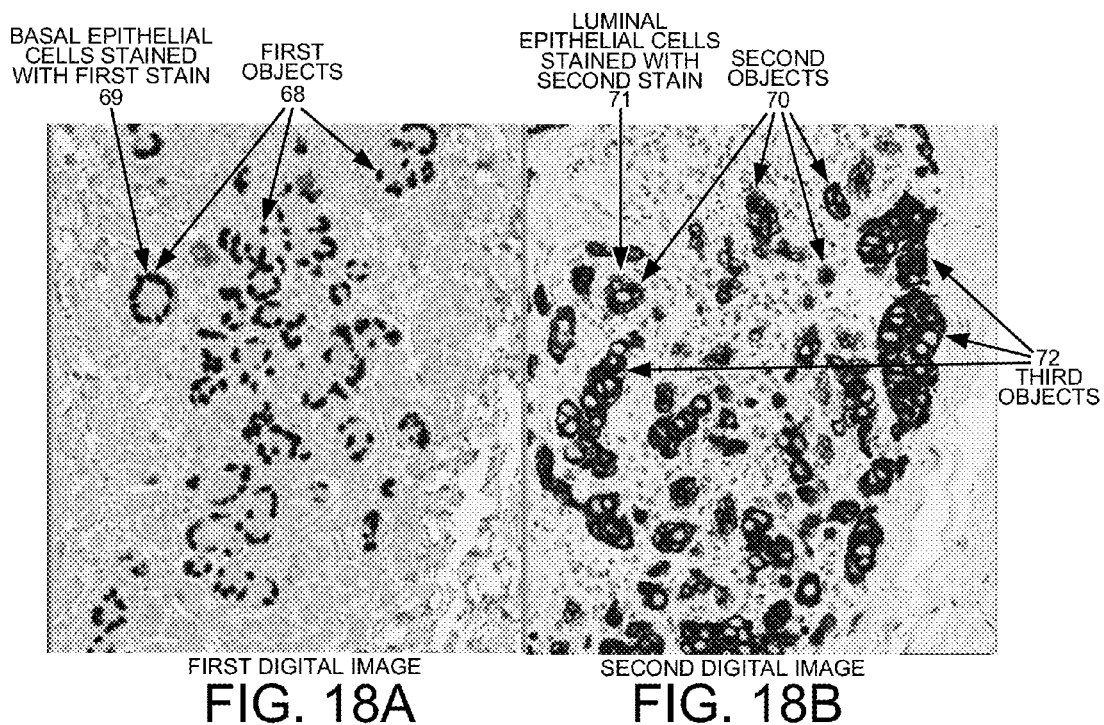
FIG. 18A
FIG. 18B
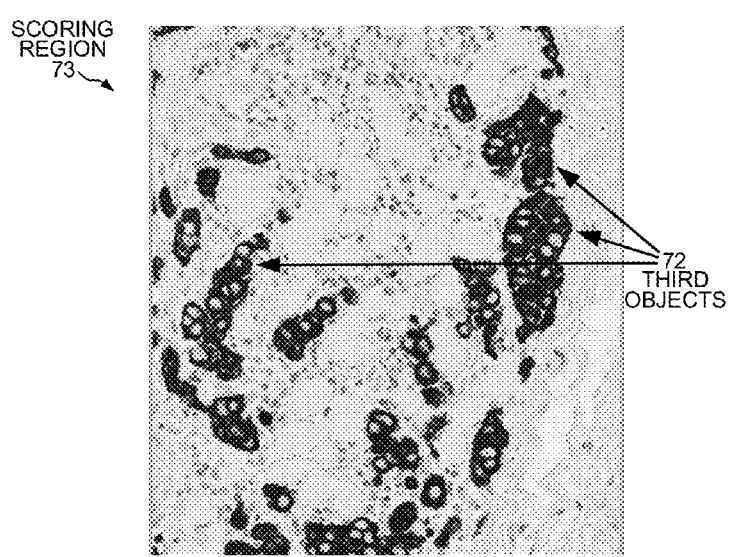
FIG. 18C

GLEASON GRADING BY SEGMENTING AND COMBINING CO-REGISTERED IMAGES OF DIFFERENTLY STAINED TISSUE SLICES

TECHNICAL FIELD

The present invention relates to a Gleason grading method that is improved by segmenting and combining digital images of co-registered slides of differently stained tissue.

BACKGROUND

Prostate cancer is one of the most commonly diagnosed cancers in men. Although prostate cancer can be detected with a blood test for high prostate-specific antigen (PSA) levels, high PSA levels can also result from non-malignant growth of the prostate. The most accurate diagnosis of prostate cancer is obtained by analyzing a stained prostate biopsy using the Gleason grading system. The Gleason grading system was developed by Donald Gleason, a pathologist at the Veterans Administration, and correlates patterns in prostate biopsy specimens with tumor mortality rates.

The Gleason grading system evaluates the glandular architecture of the prostate tissue. Tissue is assigned a grade based on the overall pattern of the glands as well as the shapes of the individual glands. Malignant cells disrupt the regular pattern of the glands. Glands arranged in a disorganized, irregular pattern with only a small area of stroma between the glands are diagnosed as cancerous. In addition, tissue in which fewer of the individual glands are circular is also diagnosed as cancerous. Cancerous prostate tissue is classified into five grades 1 through 5 of decreasing regularity and circularity. The grades of the two patterns that cover the largest areas of the biopsy tissue are added to obtain the Gleason score.

The primary Gleason grade must be greater than 50% of the total pattern of the cancerous tissue. The secondary Gleason grade must be less than 50%, but at least 5%, of the pattern of the total cancer observed. If the secondary pattern covers less than 5% of the total area of observed cancer, the secondary grade is assigned the same grade as the primary grade. The sum of the primary and secondary Gleason grades is the Gleason score. For example, if the most prevalent pattern falls into grade 4 and the second most prevalent pattern falls into grade 3, then the Gleason score is 7.

Gleason grading is typically performed by a pathologist who visually evaluates a magnified image of a stained tissue sample. The pathologist manually inspects each cancerous area of a slide of stained tissue, classifies the patterns of the glands in each area based on the shape of the individual glands and the arrangement of neighboring glands to one another, and assigns a Gleason grade to each area of the tissue being graded. Then the pathologist determines an overall Gleason score for the tissue sample based on which Gleason grade was assigned to the largest area and to the second largest area of the tissue.

Manually grading prostatic tissue is difficult because the pathologist must consistently evaluate a large number of cancerous areas on a highly magnified image of stained tissue. The pathologist may not miss any cancerous area. Moreover, the pathologist must consistently evaluate the gland arrangement and the shapes of individual glands in the various areas of a tissue slide as well as on other tissue slides in order to obtain an accurate Gleason score.

A method is sought for increasing the accuracy of Gleason grading performed on stained prostate tissue by reducing the inconsistencies and missed areas that commonly occur with manual grading.

SUMMARY

A method for obtaining an improved histopathological score generates image objects from images of tissue containing stained epithelial cells. For example, a Gleason score of prostate tissue is determined by classifying tissue patterns in a scoring region. Alternatively, the most prevalent Gleason cell patterns in the stained tissue are determined by counting the number of image objects that possess predetermined forms or structures. The method can also be used to obtain an improved Allred score or an improved Elston-Ellis score relating to breast tissue.

A first tissue slice is stained with a first stain that stains basal epithelial cells. Examples of the first stain are tumor protein p63, cytokeratin 5 and cytokeratin 14. Tumor protein p63 stains the nuclei of basal epithelial cells that are in contact with a basal membrane. A first digital image is acquired of the first tissue slice that is stained with the first stain. Image analysis software then generates first image objects that correspond to the basal epithelial cells that are stained with the first stain.

A second tissue slice is stained with a second stain that stains luminal epithelial cells. Examples of the second stain are cytokeratin 8 and cytokeratin 18 (CK18). A second digital image is acquired of the second tissue slice that is stained with the second stain. Image analysis software then generates second image objects that correspond to the luminal epithelial cells that are stained with the second stain. The first digital image is then co-registered with the second digital image.

In an alternative embodiment, the same tissue slice is stained with both the first stain and the second stain. In the analysis of prostate tissue, for example, one slice of a prostate biopsy sample can be stained with both p63 and CK18. The nuclei of the basal epithelial cells are stained one color, while the luminal epithelial cells are stained another color. A single digital image is acquired of the tissue slice that has been stained with the two biomarkers. Image analysis software then generates the first image objects and the second image objects from the single digital image. This alternative embodiment does not require one image of tissue stained with p63 to be co-registered with another image of tissue stained with CK18.

Regardless of whether one slice or two slices are stained with the first and second stains, image analysis software then defines third objects to include only those second objects that have more than a minimum separation from any of the first objects. A scoring region is defined that includes the third objects, and the histopathological score is determined based on the tissue that falls within the scoring region. The scoring region can include the area of just the third objects, or the scoring region can include all areas that are not occupied by those second objects that are not also third objects. In the second alternative, the scoring region includes the region of the stroma. For example, a Gleason score is determined by classifying the most prevalent Gleason patterns of the third objects in the scoring region.

In another embodiment, instead of determining a histopathological score in a scoring region, the histopathological score is determined based on the number of the third objects that possess predetermined forms or structures. The form of each third object is determined based on object features such as the object's asymmetry, elliptic fit, roundness, number of branches, length, width, area and distance to its nearest neighbor. An object's form is also dependent on the number of other third objects in a unit area surrounding the third object. These object features are then used to determine whether a particular third object possesses one of five predetermined forms corresponding to the five Gleason patterns. The number of third objects that possess the predetermined form of each Gleason pattern is counted. The Gleason score is then determined based on the two most prevalent Gleason patterns.

In another embodiment, the histopathological score is not based on the third objects generated from cells stained with the second stain. Instead, a third tissue slice is stained with a third stain, such as hematoxylin and eosin (H&E). A third digital image is then acquired of the third tissue slice, and fourth objects are generated from the cells stained with the third stain. The third digital image is then co-registered with the second digital image, and the scoring region determined above is located in the third digital image. The histopathological score is then determined based on the fourth objects that fall within the scoring region. For example, a Gleason score is determined based on the objects stained with H&E in the scoring region.

In another embodiment, image objects are displayed on a graphical user interface and permit a pathologist to obtain an improved histopathological score. A first digital image is segmented to generate first objects corresponding to tissue stained with a first stain that stains basal membranes of the tissue. A second digital image is segmented to generate second objects corresponding to tissue stained with a second stain that stains epithelial cells of the tissue. The first digital image and the second digital image are co-registered. The second digital image is then displayed on a graphical user interface by highlighting a subset of the second objects that includes only those second objects that have at least a minimum separation from any of the first objects. The pathologist is then able to determine a histopathological score by classifying the highlighted subset of the second objects.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 18A illustrates a step of the method of FIG. 3 in which the first objects corresponding to basal cells stained with p63 are generated.

FIG. 18B illustrates a step of the method of FIG. 3 in which the second objects corresponding to luminal cells stained with CK18 are generated.

FIG. 18C illustrates a step of the method of FIG. 3 in which third objects are defined that include only those second objects that have more than a minimum separation from any of the first objects.

DETAILED DESCRIPTION

Reference will now be made in detail to some embodiments of the invention, examples of which are illustrated in the accompanying drawings.

Figure 1:
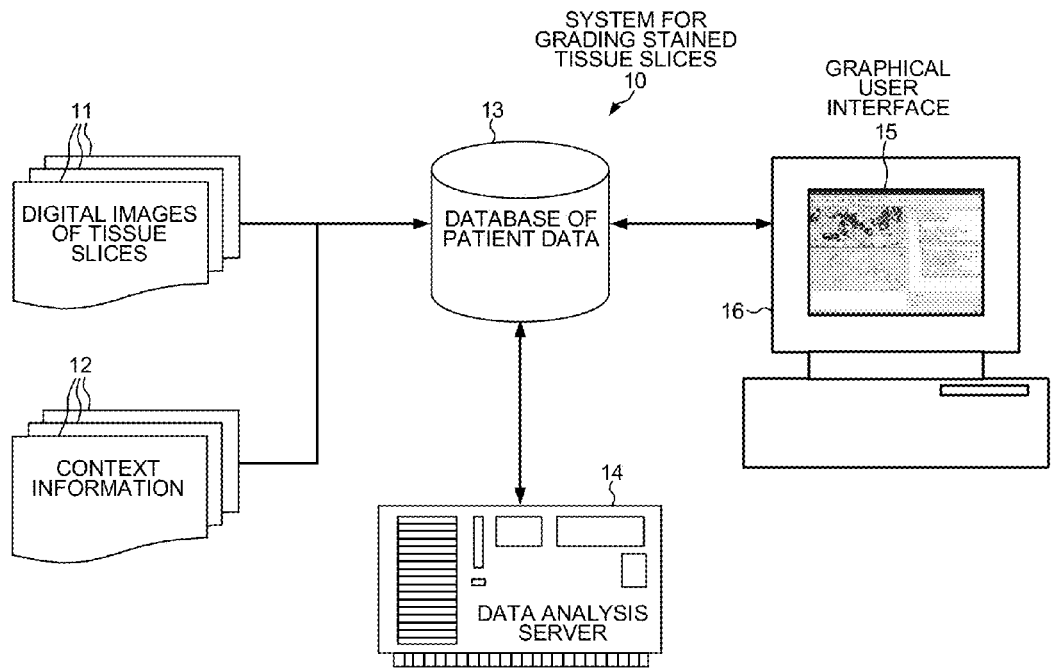
FIG. 1 is a diagram of a novel system for determining a histopathological score by defining image objects in digital images of stained basal and luminal epithelial cells.

FIG. 1 shows a system 10 for grading stained samples of glandular tissue, such as human prostate, breast, colon and lung tissue. In the context of the novel Gleason grading method described herein, immunohistochemistry samples are stained with hematoxylin and eosin (H&E), cytokeratin 18

(CK18) and transcription factor p63. Digital images 11 of the tissue slices are then acquired at high magnification. The input data for the image analysis can also include patient medical history and demographic data that is used as context information 12 for calculating parameters used in the image analysis. For example, identifying areas of cancerous glands can be assisted by knowing whether a patient smokes or whether there is a history of cancer in the patient's family.

The acquired digital images 11 as well as the context information 12 are stored in a database 13 of patient data. Image analysis software executing on a data analysis server 14 then performs intelligent image processing and automated classification and quantification. The image analysis software is a computer program product tangibly embodied on a computer-readable storage medium in server 14 and comprises computer readable and executable program instructions that when executed by a processor on server 14 provide a visual display on a graphical user interface 15 of an interconnected display device 16, such as a personal computer. The image analysis software transforms unlinked input data in the form of pixels into a hierarchical network of objects.

System 10 co-registers, analyzes, grades and displays the digital images 11 of tissue slices that have been stained with the various biomarkers. The image analysis program prepares links between some objects and thereby generates higher hierarchically ranked objects. The image analysis program provides the higher hierarchically ranked objects with properties, classifies them, and then links those objects again at a still higher level to other objects. The higher hierarchically ranked objects are used to find target objects in the images more rapidly. More easily detected starting objects are first found and then used to identify hard-to-find objects in the hierarchical data structure.

Both general and subject-specific knowledge is used to classify and segment objects in the images. The knowledge and the program flow of the image analysis program are separated in the software structure. The parameters by which the image analysis is performed, for example thresholds of size or brightness, can be changed without having to revise the process hierarchy of software steps. The image analysis software displays both the original digital images 11 as well as the corresponding processed segmented images on the graphical user interface 15. Classified and segmented objects in the digital images are marked or highlighted to correspond to their classification. For example, objects that have a membership in the same class are depicted in the same color.

Figure 2:
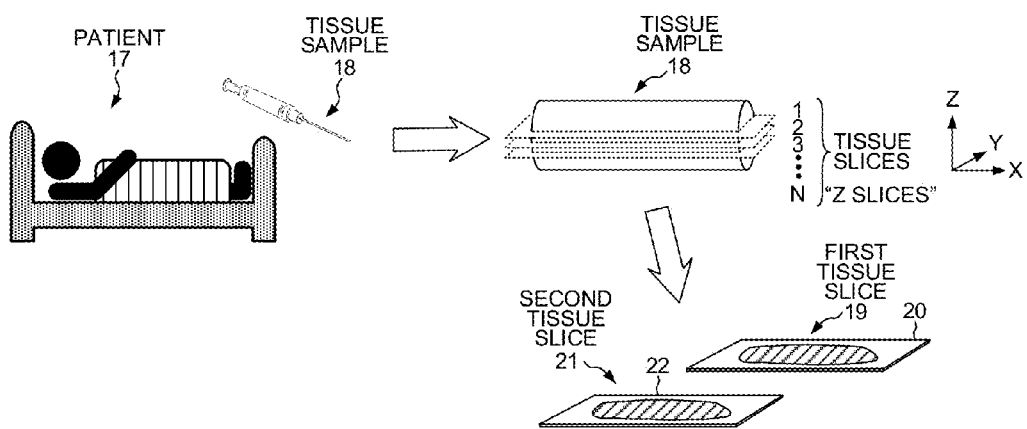
FIG. 2 illustrates the process for acquiring the digital images of stained epithelial cells that are scored by the system of FIG. 1.

FIG. 2 illustrates the process for acquiring the digital images 11 that are co-registered, analyzed, graded and displayed by system 10. The tissue portions that are to be stained with various protein and receptor biomarkers are typically taken from a live patient 17 in the form of a biopsy. In the context of Gleason grading of cancerous prostate tissue, immunohistochemistry samples are prepared from paraffin-embedded biopsy specimens of prostate tissue surgically removed from patient 17. Typically, prostate needle biopsy specimens are used. Today, most doctors agree that an initial prostate biopsy should include at least ten to twelve needle core samples.

The cylindrical tissue sample 18 is then sliced into many adjacent thin planar slices. Because the slices are very thin, each adjacent slice contains practically the same tissue structures. The slices are located at the same position of the tissue sample in the x and y dimensions. The slices are called "z slices" because they depict different z altitudes at the same position in the x and y dimensions of the tissue sample. FIG. 2 shows a first slice 19 on a first slide 20 as well as a second slice 21 on a second slide 22. Second slice 21 originated from tissue sample 18 adjacent to first slice 19. Before being put on a slide, each of the multiple z slices is stained with one or more different biomarkers. The same tissue reacts uniquely to each different biomarker. In the novel method of Gleason grading described below, various slices can be stained with hematoxylin and eosin (H&E), cytokeratin 18 (CK18) and transcription factor p63. A tissue slice can also be stained with multiple biomarkers at the same time. Other stains that can be used include cytokeratin 14 (CK14), Human Epidermal growth factor Receptor 2 (Her2), Her2/neu cytoplasmic stain, estrogen receptor (ER) stain, progesterone receptor (PR) stain, tumor marker Ki67, Mib, SishChr17, SishHer2, cluster of differentiation 44 (CD44) antibody stain and CD23 antibody stain. A high resolution digital image 11 is then taken of each stained slice. A typical digital image of a tissue slice has a resolution of 100,000×200,000 pixels, or 20 billion pixels.

Figure 3:
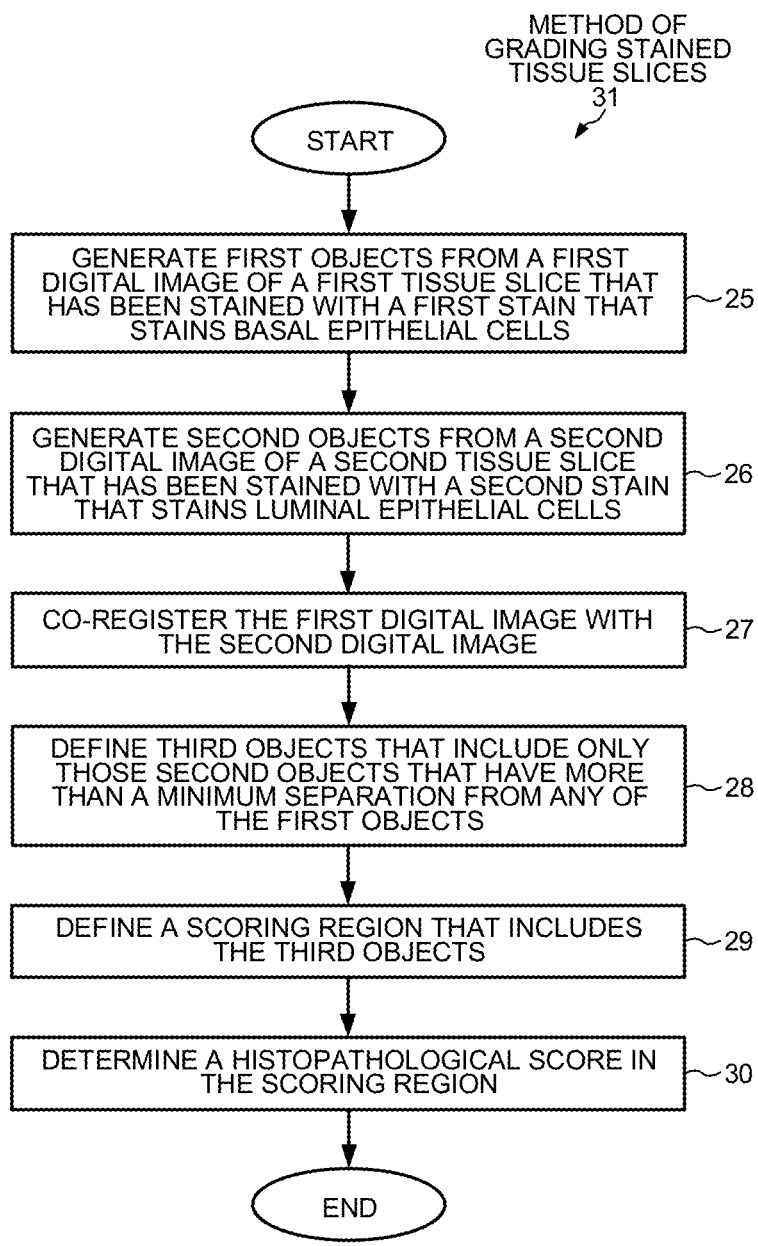
FIG. 3 is a flowchart of steps for obtaining an improved histopathological score based on the images of tissue containing the stained epithelial cells.

FIG. 3 is a flowchart of steps 25-30 of a method 31 for obtaining an improved histopathological score. For example, Gleason grading can be improved by defining a scoring region using co-registered images of differently stained prostate tissue slices. In a first step 25, system 10 generates first objects from a first digital image of first tissue slice 19. First tissue slice 19 has been stained with a first stain that stains basal epithelial cells. In a first embodiment, the tumor protein p63 is used as the first stain that stains basal epithelial cells by staining the nuclei inside basal epithelial cells. Tumor protein p63 is also known as transformation-related protein 63 and transcription factor p63. Tumor protein p63 is a protein-specific antibody (a biomarker) that in humans is encoded by the TP63 gene. Tumor protein p63 is used together with an attached dye to form a stain. Note that some biomarkers do not require an attached dye, such as hematoxylin and eosin (H&E), which has the ability to stain tissue without the addition of a dye. Staining with p63 is used to differentiate prostatic adenocarcinoma (the most common type of prostate cancer) from benign prostatic tissue. Expression of the p63 gene is down-regulated in adenocarcinoma of the prostate compared with normal prostate tissue. Thus, p63 stains the nuclei of basal epithelial cells in healthy prostate glands.

Figure 4:
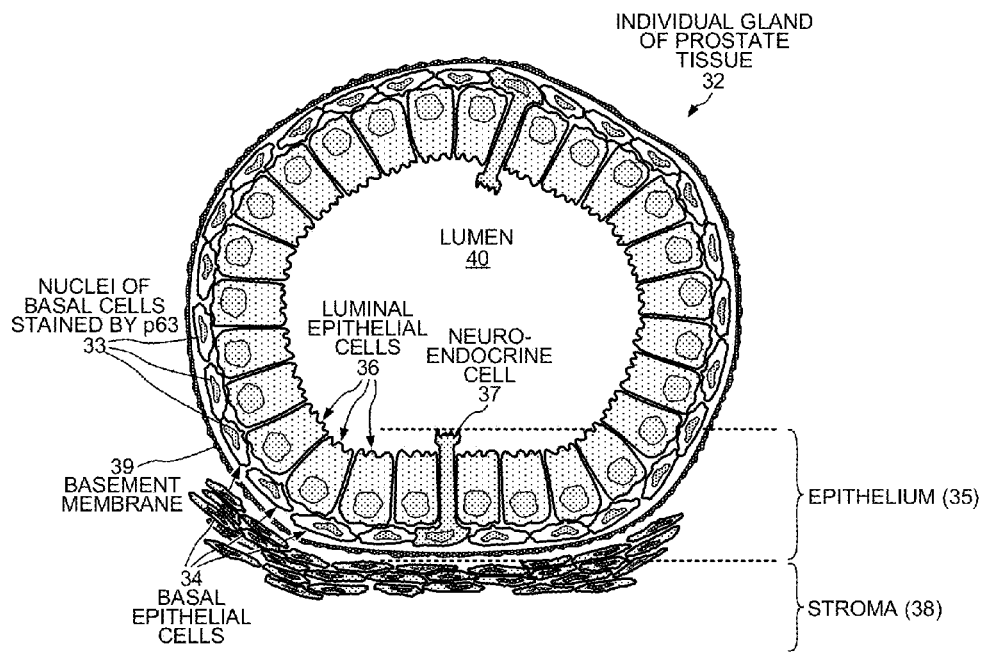
FIG. 4 is a schematic diagram of a gland of prostate tissue in which p63 has stained the nuclei of basal cells, and CK18 has stained the luminal cells.

FIG. 4 illustrates the structure of a gland 32 of normal prostate tissue in which p63 has stained the nuclei 33 of basal cells 34. Normal prostatic epithelium 35 is composed of basal 34, luminal 36 and neuroendocrine 37 cells that form glands surrounded by fibro-muscular tissue called stroma 38. A basement membrane 39 separates the gland 32 from the stroma 38. Each gland is composed of rows of epithelial cells located around a "lumen" or duct 40. In cancerous prostate tissue in which the basement membrane 39 no longer surrounds the basal epithelial cells 34, tumor protein p63 does not stain the nuclei of the basal cells. Thus, healthy prostate basal cells express p63, and cancerous basal cells that do not have intact basement membranes do not express p63. The difference in p63 expression is also indicative of cancer progression in other epithelial organs, such as the breasts, lungs and ovaries.

Figure 5:
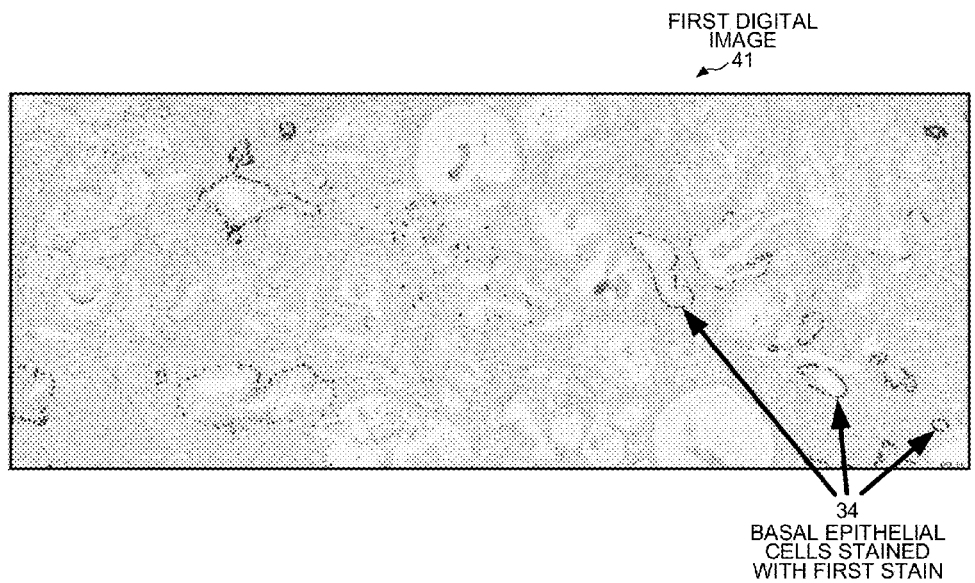
FIG. 5 is a digital image of a tissue slice in which the nuclei of basal epithelial cells have been stained with p63.

FIG. 5 shows a first digital image 41 of first tissue slice 19. First digital image 41 is a high resolution image of prostate tissue in which the nuclei 33 of basal epithelial cells 34 have been stained with p63. Note that the stained nuclei 33 primarily form rings or loops around the lumens of healthy prostate glands. Image analysis is performed on each of the images acquired by system 10, including first digital image 41 of first tissue slice 19 and a second digital image 42 of second tissue slice 21. Then system 10 generates a hierarchical data network 43 of image objects for each image.

Figure 6:
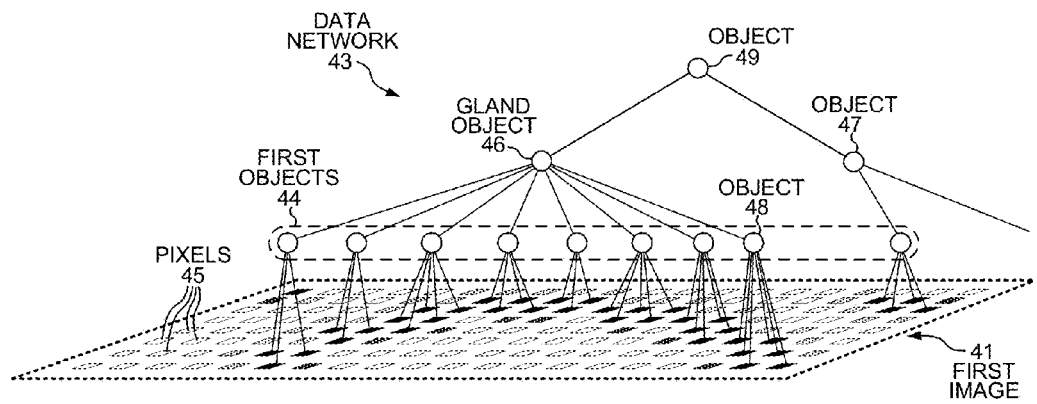
FIG. 6 illustrates a data network generated by the system of FIG. 1 in which image objects of the data network are linked to selected pixels of the image of FIG. 5.

FIG. 6 illustrates exemplary data network 43 that is generated by system 10. In step 25, system 10 generates first objects 44 from first digital image 41 based on the stained basal epithelial cells 34. The image analysis program of system 10 uses object-oriented image analysis to generate objects of data network 43 by linking selected pixels 45 to objects according to a process hierarchy of steps and algorithms and according to a classification network. For a more detailed description of generating a data network using a process hierarchy and a class network, see U.S. Pat. No. 8,319,793, the contents of which are incorporated herein by reference. Each digital image comprises pixel values associated with the locations of each of the pixels 45. The image analysis program operates on the digital pixel values and links the pixels to form objects. Each object is linked to a set of pixel locations based on the associated pixel values. For example, an object is generated by linking to the object those pixels having similar characteristics, such as hue, saturation and brightness as defined by the pixel value. Thresholds of brightness at pixel locations that are grouped together can be obtained from a histogram of the pixel values in the digital image. The pixels form the lowest hierarchical level of data network 43.

In step 25, pixels having the color and intensity imparted by the dye attached to the p63 antibody are identified and linked to those objects 44 that correspond to the stained nuclei 33. The first objects 44 form the second hierarchical level of data network 43. Then image objects are linked together into classes according to membership functions of the classes defined in the class network. For example, objects representing nuclei that belong to the same gland are linked together to form gland objects 46-47 in a third hierarchical level of data network 43. In FIG. 6, one of the first objects 48 that corresponds to a stained nucleus of a basal epithelial cell is linked to gland object 46 that corresponds to the gland surrounded by the stained basal epithelial cells. An additional object 49 is generated in a fourth hierarchical level of data network 43 and is linked to all of the objects that represent glands surrounded by stained basal epithelial cells. Thus, the objects corresponding to the healthy prostate glands are linked to object 49.

Figure 7:
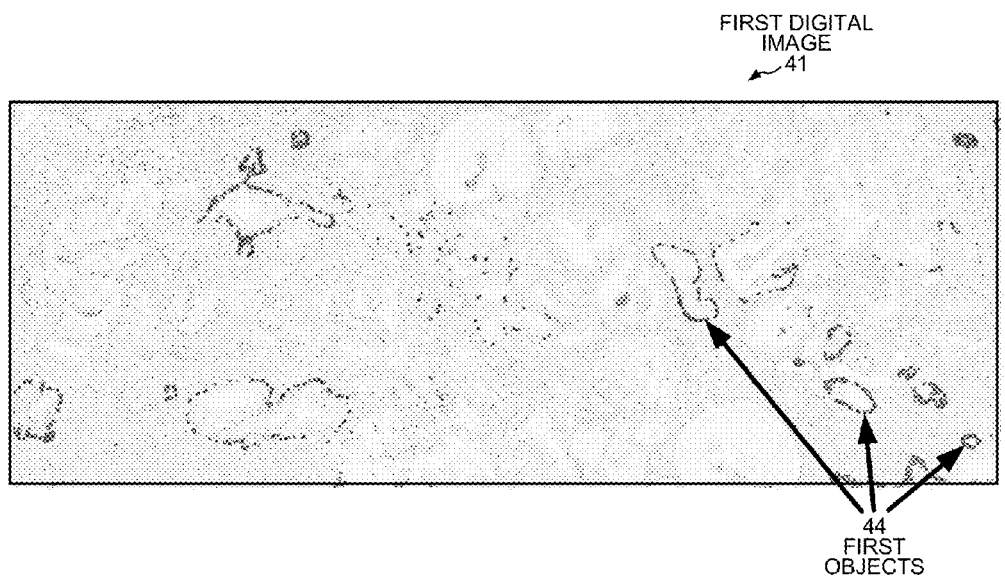
FIG. 7 shows image objects of stained nuclei of basal epithelial cells that are highlighted and superimposed over the image of FIG. 5.

FIG. 7 shows how first digital image 41 is displayed on the graphical user interface 15 of system 10 after step 25 is performed. The first objects 44 that are generated from the stained nuclei 33 of basal epithelial cells 34 are highlighted and superimposed over first digital image 41.

In step 26 of method 31, system 10 next generates second objects from second digital image 42 of second tissue slice 21. Second tissue slice 21 has been stained with a second stain that stains luminal epithelial cells 36. In the first embodiment, cytokeratin 18 (CK18) is used as the second stain that stains the luminal cells of the prostate tissue. Immunocytochemical staining for CK18 can also be used to stain other types of other epithelial organs, such as the breasts, lungs, ovaries and kidneys.

Figure 8:
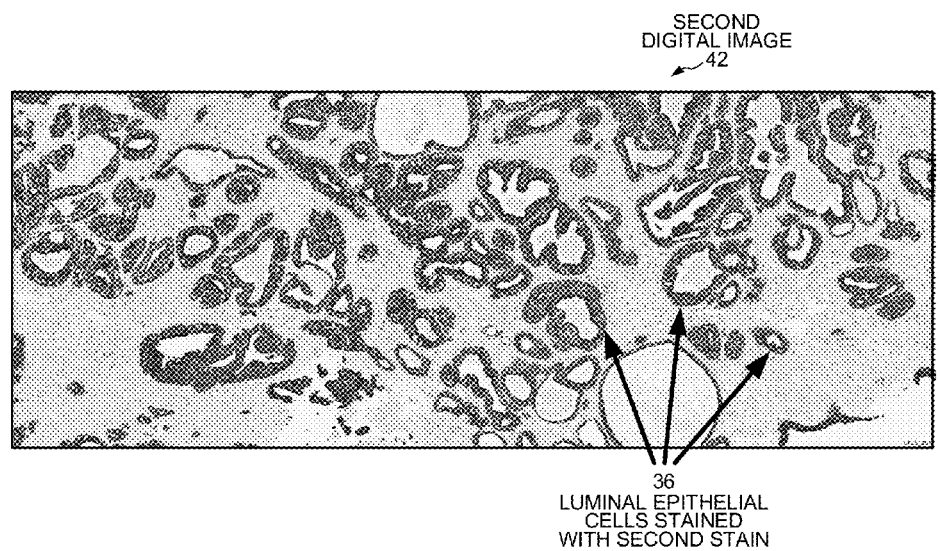
FIG. 8 is a second digital image of a tissue slice in which the luminal epithelial cells have been stained with CK18.

FIG. 8 shows second digital image 42 of second tissue slice 21. In second digital image 42, luminal epithelial cells 36 of tissue sample 18 have been stained with CK18.

Figure 9:
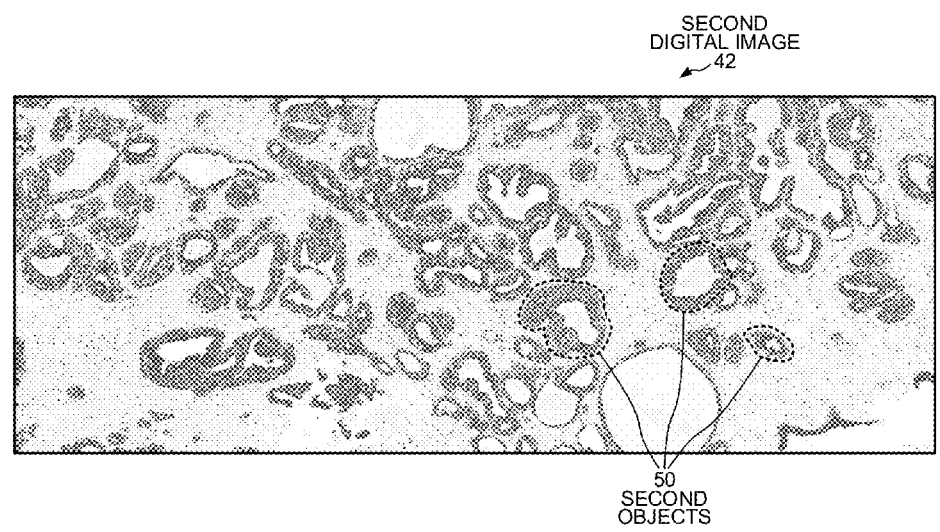
FIG. 9 shows second image objects of stained luminal epithelial cells that are highlighted and superimposed over the image of FIG. 8.

FIG. 9 shows how second digital image 42 is displayed on the graphical user interface of system 10 after step 26 is performed. The second objects 50 that are generated from the stained luminal epithelial cells 36 are highlighted and superimposed over second digital image 42. In step 26, pixels having the color and intensity imparted by the dye attached to CK18 are linked to luminal cell objects in the second hierarchical level of data network 43. Luminal cell objects that are adjacent to one another are linked together to generate the second objects 50 in the third hierarchical level of data network 43. The second objects 50 represent the outlines of glands surrounding lumens. However, luminal epithelial cells express CK18 regardless of whether the luminal cells are surrounded by basal epithelial cells 34 or a basal membrane 39. Thus, the second objects 50 are also generated around clumps of luminal epithelial cells that lack an intact basal membrane and are no longer part of healthy glands.

In step 27, the image analysis program of system 10 co-registers first digital image 41 with second digital image 42. Because first tissue slice 19 and the adjacent second tissue slice 21, which correspond to the digital images 41 and 42 respectively, are very thin, each slice contains practically the same tissue structures. In order to determine which locations on the two slices correspond to the same structures, locations on the two digital images 41-42 of slices 19 and 21 must first be co-registered with one another. Tissue objects are used as location markers to perform the co-registration. In addition to generating objects corresponding to epithelial cells, the image analysis program performs general segmentation on the images 41-42 to generate larger tissue objects such as blood vessels, glands or glomeruli. Several of these tissue objects that match in both images are then used to co-register the images. Obtaining a precise co-registration of the two digital images 41-42 is important for obtaining an accurate Gleason score using method 31.

Figure 10:
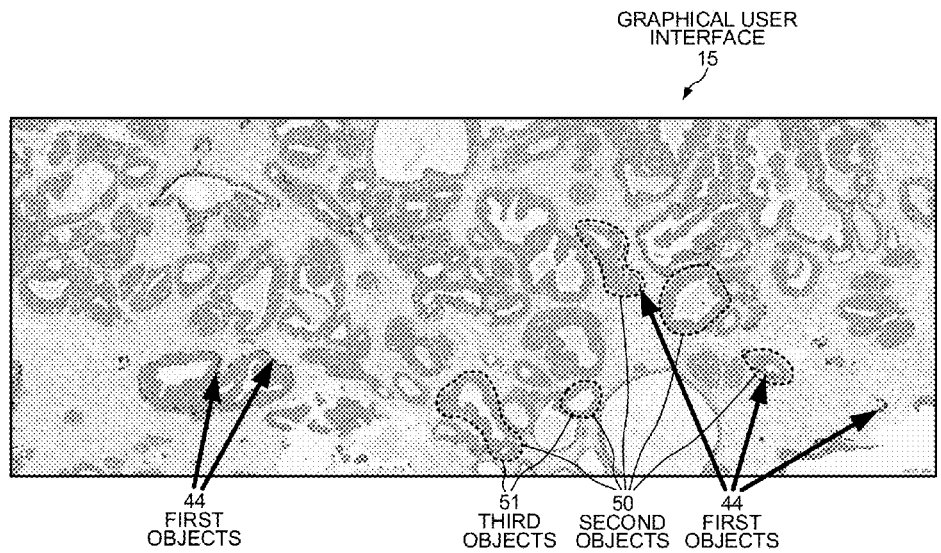
FIG. 10 shows the graphical user interface of the system of FIG. 1 in which objects corresponding to stained basal cells are superimposed over the objects corresponding to stained luminal cells, which are both superimposed over the image of FIG. 5.

FIG. 10 shows the graphical user interface of system 10 after co-registration step 27 is performed. The first objects 44 that are generated from the stained nuclei 33 of basal epithelial cells 34 are highlighted and superimposed over the second objects 50 that are generated from the stained luminal epithelial cells 36. Both the first objects 44 and second objects 50 are superimposed over second digital image 42. The first objects 44 appear as black dots in FIG. 10.

In step 28, third objects 51 are defined that include only those second objects 50 that have more than a minimum separation from any of the first objects 44. Thus, the third objects 51 include all second objects 50 that are not adjacent to at least one first object 44. The third objects 51 represent aggregations of luminal epithelial cells that lack an intact basal membrane and are no longer part of a healthy prostatic gland. The stained luminal epithelial cells that make up the third objects 51 form patterns of prostate tissue that fall within one of the five sample Gleason patterns used to categorize the severity of prostatic adenocarcinoma in the biopsy tissue. Two third objects 51 are labeled in FIG. 10.

Figure 11:
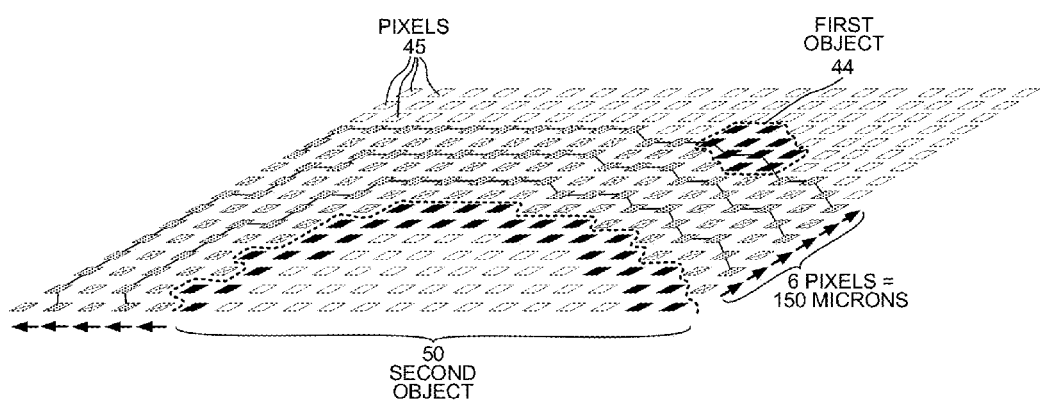
FIG. 11 illustrates a method of growing the second objects of FIG. 9 to determine which second objects have a minimum separation from any of the first objects of FIG. 7.

FIG. 11 illustrates one way in which the image analysis program of system 10 defines the third objects 51. The third objects 51 are determined by growing the second objects 50 by the minimum separation and then excluding from the third objects those second objects that have grown into any of the first objects 44. In one example, the value of the minimum separation is set at 150 microns. In any event, the minimum separation should be greater than the average distance between the luminal epithelial cells 36 and basement membrane 39 as shown in FIG. 4. Each second object 50 is expanded outwards normal to the boundary of the object by a number of pixels that corresponds to about 150 microns. The number of pixels that corresponds to about 150 microns depends on the resolution of the digital images 41-42. In the example of FIG. 11, the distance across six pixels is about 150 microns. When second object 50 is expanded by six layers of pixels, the expanded object occupies some pixels of first object 44. Therefore, second object 50 does not have the minimum separation from first object 44, and second object 50 in FIG. 11 is not defined by the image analysis program as a third object.

Figure 12:
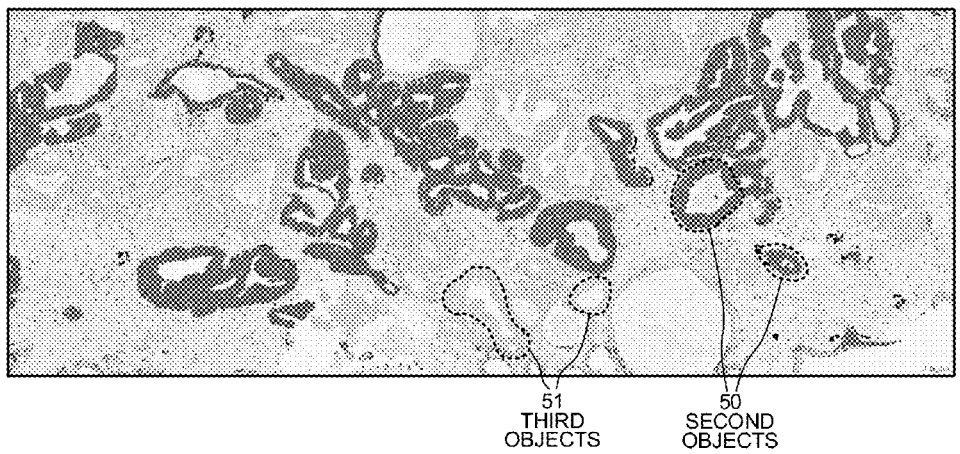
FIG. 12 shows the image of FIG. 5 in which those second objects of FIG. 9 that have grown into any first objects of FIG. 7 using the method illustrated in FIG. 11 are displayed in their original sizes as darker objects.

FIG. 12 shows the graphical user interface of system 10 after each second object 50 has been grown by the minimum separation. Those second objects 50 that grew into first objects 44 are displayed in their original sizes as darker objects. The remaining second objects that are not darkened are defined as the third objects 51.

Figure 13:
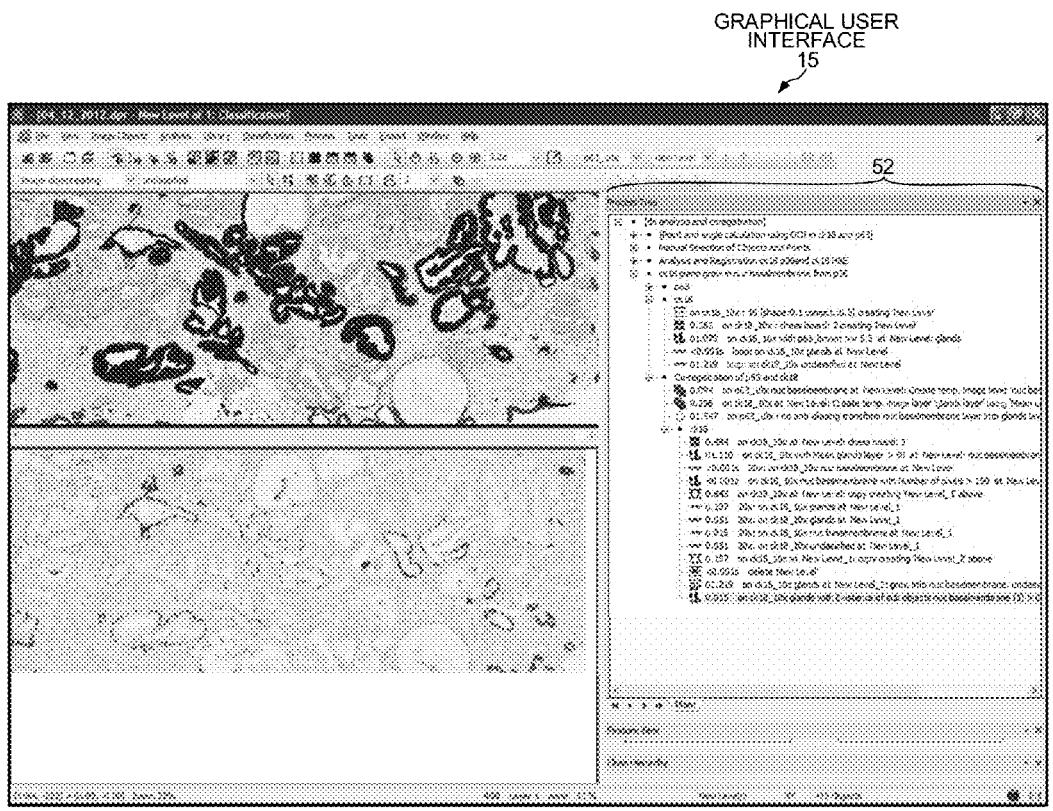
FIG. 13 is a screenshot of the graphical user interface of the system of FIG. 1 displaying a process hierarchy of software steps by which the system defines those second objects of FIG. 9 that are not darkened in FIG. 12.

FIG. 13 is a screenshot of graphical user interface 15 of system 10 with the image of FIG. 12 displayed above the co-registered image of FIG. 7 at the left of the screen. In a pane 52 at the right of the screen, system 10 displays the process hierarchy of software steps by which the third objects 51 and a scoring region are defined. The steps of the process of method 31 can be edited by the user of system 10 using graphical user interface 15.

Figure 14:
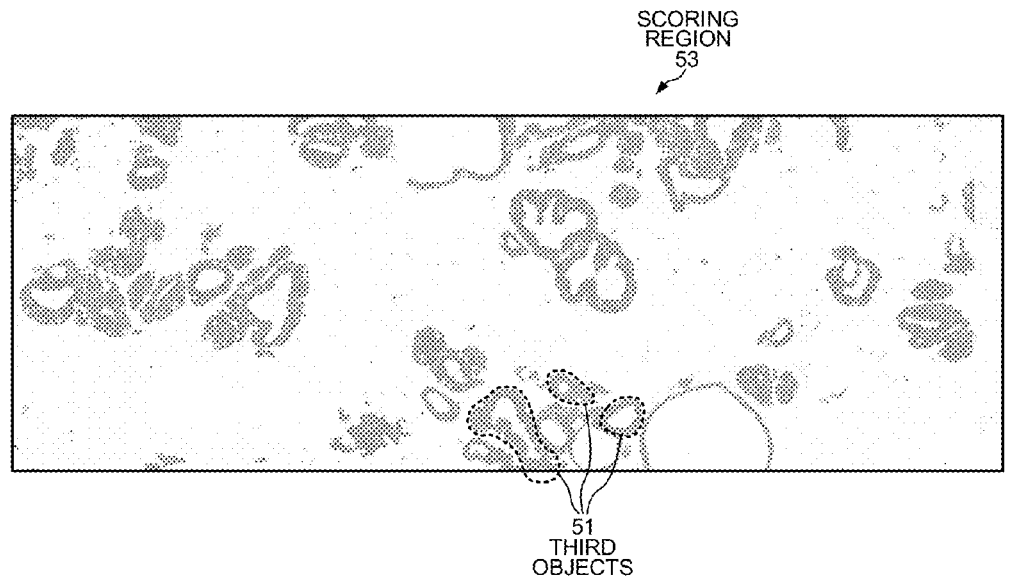
FIG. 14 shows the graphical user interface of the system of FIG. 1 in which only a scoring region on the image of FIG. 8 is displayed to the user.

In step 29, a scoring region 53 is defined that includes the third objects 51. In a first implementation, the scoring region 53 on the x-y space of the co-registered images 41-42 includes all areas that are not occupied by those second objects 50 that are not also third objects 51. In other words, the scoring region 53 includes all of the x-y space of the co-registered images 41-42 that is not occupied by the darkened first objects 50 shown in FIG. 12. Thus, the scoring region 53 in the first implementation includes the region of the stroma. In a second implementation, the scoring region on the x-y space of the co-registered images 41-42 includes only those areas occupied by the third objects. FIG. 14 shows the graphical user interface of system 10 on which only the scoring region 53 on second digital image 42 is displayed to the user. The areas of second digital image 42 that lie outside of the scoring region 53 are whited out. In the second implementation, the pathologist is shown only the stained luminal epithelial cells of the cancerous prostate tissue. The pathologist then classifies each area of the second tissue slice 21 as falling within one of the five sample Gleason patterns.

Figures 15A, 15B:
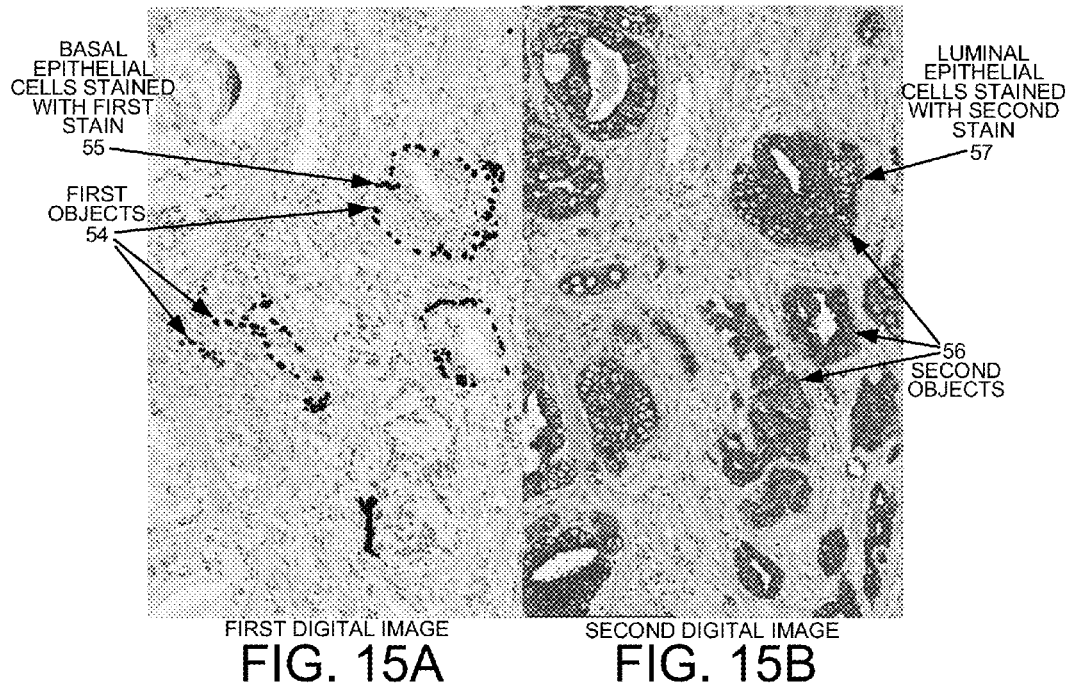
FIG. 15A illustrates a step in which the system of FIG. 1 generates first image objects from a first digital image of a slice of prostate tissue in which basal cells have been stained.
FIG. 15B illustrates a step in which the system of FIG. 1 generates second image objects from a second digital image of a slice of the prostate tissue in which luminal cells have been stained.

FIGS. 15A-D illustrate another example of steps 25-29 in which the scoring region 53 is defined according to the second implementation. FIG. 15A illustrates step 25, in which system 10 generates first objects 54 from a first digital image of a slice of prostate tissue. The prostate tissue has been stained with a first stain, such as tumor protein p63, that stains basal epithelial cells 55. Tumor protein p63 stains the nuclei of the basal epithelial cells 55 in the glands of healthy prostate tissue. In step 25, pixels having the color and intensity imparted by the dye attached to the p63 antibody are linked to objects that correspond to the stained basal epithelial cells 55. The first objects 54 are highlighted and superimposed over the first digital image.

Figures 15C, 15D:
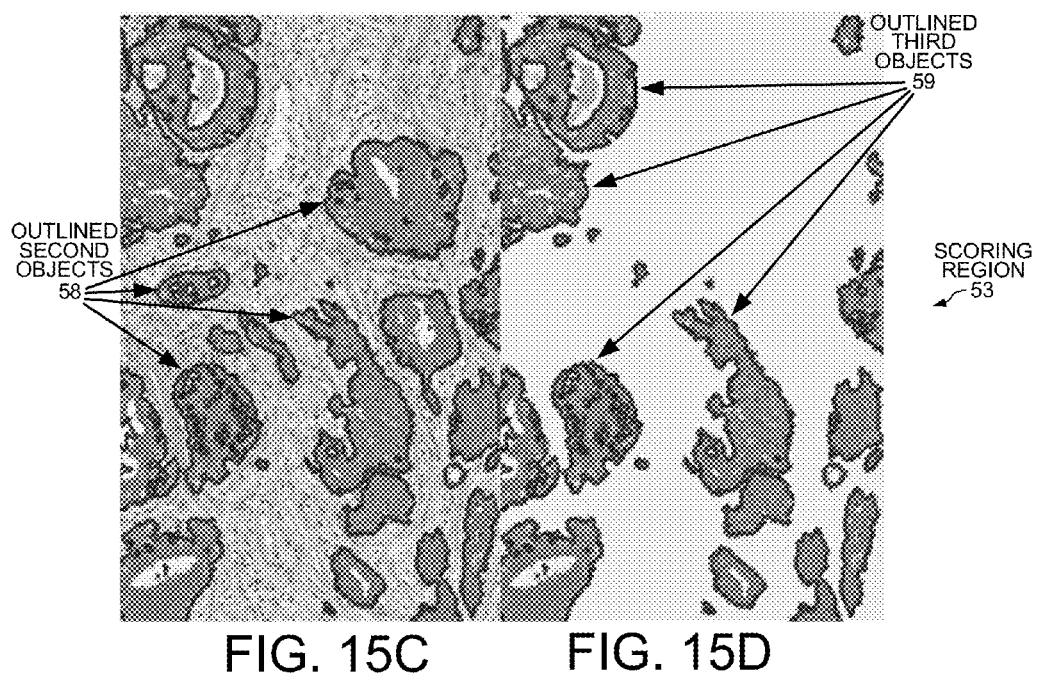
FIG. 15C shows the second objects of FIG. 15B that are outlined and superimposed over the image of the stained prostate tissue.
FIG. 15D shows outlined third objects that include only those second objects of FIG. 15C that have more than a minimum separation from any of the first objects of FIG. 15A.

FIG. 15B illustrates step 26 of method 31, in which system 10 generates second objects 56 from a second digital image of a second slice of the prostate tissue. The second tissue slice has been stained with a second stain, such as CK18, that stains luminal epithelial cells 57. In FIG. 15C, the second objects 56 that are generated from the stained luminal epithelial cells 57 are outlined superimposed over the second digital image. FIG. 15C shows the outlined second objects 58. Luminal epithelial cells express CK18 regardless of whether the luminal cells are surrounded by basal epithelial cells and a basal membrane, so the outlined second objects 58 also surround clumps of luminal epithelial cells that lack an intact basal membrane and are no longer part of healthy glands. Then in step 27, the image analysis program co-registers the first digital image and the second digital image.

FIG. 15D shows outlined third objects 59 that are defined in step 28. The image analysis program defines third objects that include only those second objects 56 that have more than a minimum separation from any of the first objects 54. Thus, the third objects include all second objects 56 that are not adjacent to at least one first object 54. The outlined third objects 59 are indicative of aggregations of luminal epithelial cells that lack an intact basal membrane and are no longer part of a healthy gland of prostate tissue. FIG. 15D also illustrates the second implementation of the scoring region 53 defined in step 29. The scoring region 53 is defined to include only the third objects 59, so the scoring region does not include the region of the stroma. In step 30, Gleason scoring is performed only in the scoring region 53 of the second digital image that includes the areas of the third objects 59.

A typical digital image of a tissue slice has a resolution of many billions of pixels. Each of the recommended number of ten needle biopsies to test for prostate cancer yields many slices that each correspond to a digital image. Therefore, in order to obtain an accurate composite Gleason score for all of the resulting high resolution digital images, the pathologist must visually inspect a very large area of magnified prostate tissue that includes many hundreds if not thousands of glands.

Figure 16:
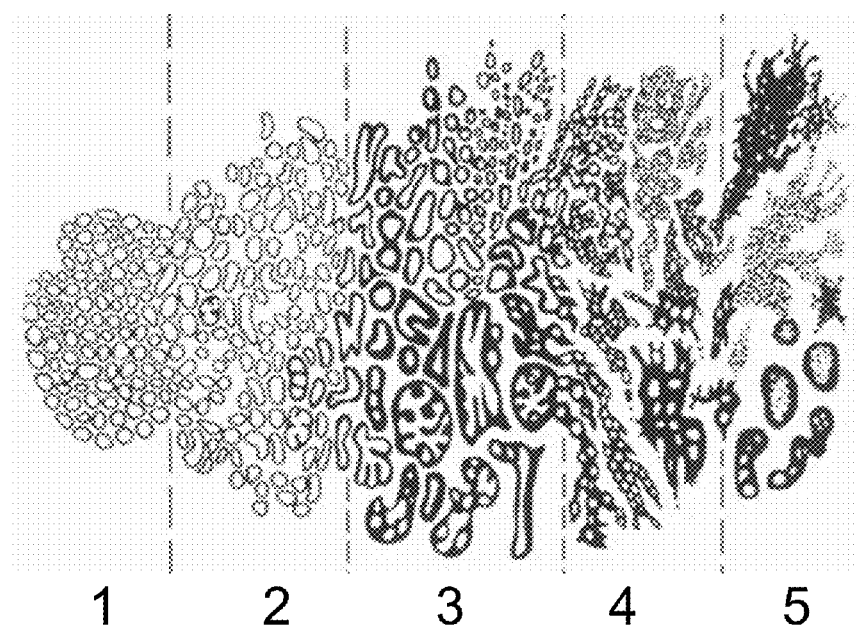
FIG. 16 is a diagram of sample patterns of prostate tissue that fall into the five Gleason scoring patterns for prostatic adenocarcinoma.

FIG. 16 illustrates sample tissue patterns that fall into the five Gleason categories. The pathologist assigns one of the Gleason patterns to each field of view as the pathologist scans the entire scoring region 53. Then the pathologist determines which Gleason pattern covers the most area of the scoring region 53. FIG. 16 shows that the Gleason pattern one is composed of small, uniform glands. Pattern two includes more stroma between glands. Although the gland size of pattern two has a wider distribution, the average gland size of pattern two is nearly the same as for pattern one. In pattern three, cells begin to infiltrate the glands at the margins of the glands. In pattern four, there are irregular masses of cells with few glands. Pattern five is characterized by a lack of glands, and the prostate tissue includes clumps and sheets of cells.

It is a tremendous challenge for the pathologist to avoid missing any areas of prostatic adenocarcinoma on each slide as the pathologist inspects the tissue in the smaller field of view while navigating across the much larger high-resolution images. Assigning a Gleason pattern one to an area of tissue is especially difficult because healthy prostate tissue also has the small, uniform glands that are indicative of the Gleason pattern one. By using method 31, however, the healthy glands that are surrounded by a basal membrane can be distinguished from the malignant glands that do not have surrounding basal cells or basal membranes even if both the healthy and malignant glands have the same size and shape. In addition, it is also a challenge for the pathologist to classify different areas of the tissue on different slides consistently according to the five Gleason tissue patterns. By isolating those areas of each digital image that are to be assigned a Gleason pattern number, the task of generating a Gleason score is simplified. The pathologist can more easily and accurately assign Gleason pattern numbers to areas of the second digital image 42 when system 10 displays only the third objects 51 (second implementation) or the third objects with surrounding stroma (first implementation) on the graphical user interface of system 10.

The Gleason score need not be determined based on the second stain. Typically, Gleason scores are determined based on tissue stained with hematoxylin and eosin (H&E). In a second embodiment, a third digital image is acquired from tissue sample 18 and is stained with a third stain, in this example H&E. The third digital image is then co-registered with the digital images 41-42. The scoring region 53 that includes all of the x-y space of the co-registered images that is not occupied by the darkened first objects 50 in FIG. 12 is then located on the third digital image of H&E stained tissue. Fourth objects in the scoring region in the third digital image are then identified that have been stained with the third stain, and a Gleason score is determined based on tissue stained with the third stain. In this case, the scoring region 53 that is generated using p63 and CK18 acts as a mask over the third image of H&E stained tissue in order to allow the Gleason scoring to be performed only on areas of prostatic adenocarcinoma.

In addition to enabling the pathologist to assign Gleason pattern numbers more easily and accurately to areas of prostate tissue, system 10 is also able to generate its own Gleason scores. In step 30, the image analysis program of system 10 determines a histopathological score in the scoring region 53. Although the method 31 described herein determines an exemplary Gleason score, system 10 can also determine other scores, such as an Allred score or an Elston-Ellis score.

The image analysis program calculates the score separately for each high resolution digital image. The scores for each slide are then combined to yield a composite score for each prostate tissue needle biopsy. By generating hierarchically ranked objects in the hierarchical data network 43, the image analysis program is able to classify gland objects in the scoring region 53 as having various degrees of irregular shapes and arrangements between each other.

For example, the image analysis program determines the shape of each gland based on asymmetry, elliptic fit, roundness and the fit to a shape index. In addition, if a gland is not round, the program counts the number of branches and subbranches in the shape. The program also measures the length and width of each gland and the area of the gland. For example, the area of a gland can be expressed in pixels. And the program counts the number of glands per unit area and measures the average distance between glands. These object features are used to classify each subregion of scoring region 53 of a tissue slice as belonging to one of the five Gleason tissue patterns. The areas of the subregions that fall into the same Gleason pattern are then added and compared to the total area of the scoring region 53.

The primary Gleason grade is assigned to that tissue pattern that occupies more than 50% of the area of the scoring region 53. A secondary Gleason grade is assigned to that tissue pattern that occupies less than 50%, but at least 5%, of the scoring region 53. If the secondary pattern covers less than 5% of the scoring region 53, the secondary grade is assigned the same grade as the primary grade. The sum of the primary and secondary Gleason grades is the Gleason score for the tissue slice. For example, if the most prevalent pattern falls into grade 4 and the second most prevalent pattern falls into grade 5, then the Gleason score is 9.

Figure 17:
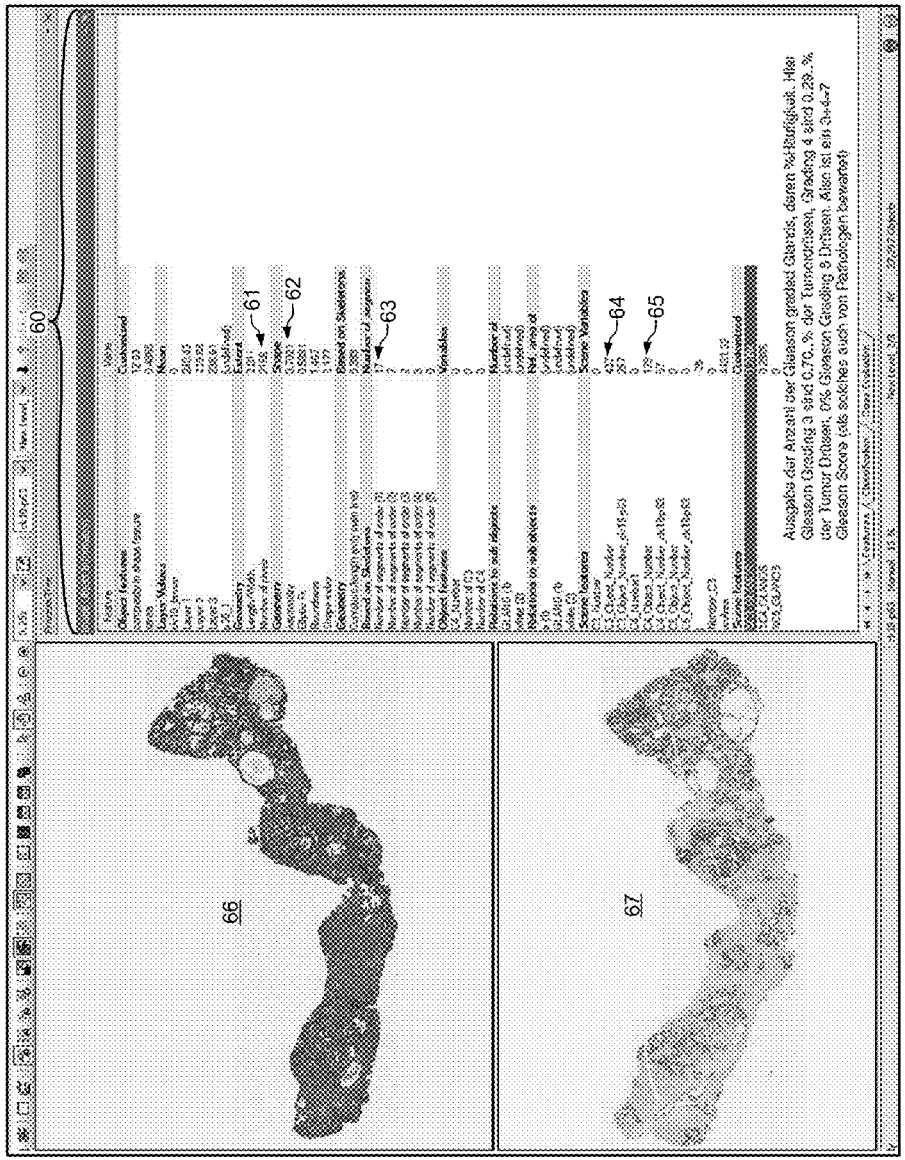
FIG. 17 is a screenshot of the graphical user interface of the system of FIG. 1 showing object features used to classify areas of the scoring region into the various Gleason patterns.

FIG. 17 is a screenshot of graphical user interface 15 of system 10 showing object features used by the image analysis program to classify areas of the scoring region 53 into the various Gleason cell growth patterns. The image analysis program is able to characterize each of the hundreds is not thousands of glands or cell aggregations in the scoring region 53. Then each gland or cell aggregation is classified as falling into one of the five Gleason patterns. A Gleason pattern is typically assigned to an area of a slide as opposed to individual glands because the Gleason patterns are based in part on the spacing between glands and the arrangement of glands relative to each other. However, the image analysis program of system 10 is able to determine a Gleason score without assigning a Gleason pattern to separate areas within the scoring region 53 because the spacing and arrangement of the glands is taken into account by measuring for each gland the distance to the nearest neighboring gland and by calculating the number of glands in the scoring region 53.

Each gland in the scoring region 53 is assigned an object number. The pane 60 entitled "Image Object Information" at the right of the screenshot of FIG. 17 lists the object features for one of the glands. For example, the largest length/width ("diameter") of the gland being represented is 2,011 pixels. The area 61 of the gland is listed as 2156 pixels. The asymmetry, elliptic fit, roundness and shape index are also calculated. For example, the asymmetry factor 62 is listed as 0.7021. Pane 60 indicates that the gland being represented has a very irregular shape, with seventeen main branches 63, seven subbranches off of main branches, two segments off of subbranches, and three fourth-order branches off of the segments.

The number of glands classified as belonging to each of the five Gleason patterns is listed in pane 60 under the heading "Scene features." No glands are classified as belonging to the Gleason patterns one, two or five. Four hundred thirty-seven glands in scoring region 53 are classified as belonging to Gleason pattern three 64, and one hundred seventy-nine glands are classified as belonging to Gleason pattern four 65. Pane 60 also indicates that two-hundred fifty-seven glands that have features similar to those of Gleason pattern three (C3_Object_Number_ck18-p63) are not counted because those glands do not fall within scoring region 53. Similarly, fifty-seven glands that have features similar to those of Gleason pattern four (C4_Object_Number_ck18-p63) are not counted because those glands also do not fall within scoring region 53. Thus, the scoring region 53 can be used to differentiate between glands that by their shape and arrangement alone would all seem to be belong to the same Gleason pattern.

In the upper left pane 66 of the screenshot of FIG. 16, system 10 displays a digital image of the prostate tissue from which the gland objects described in pane 60 were generated, segmented and classified. The prostate tissue shown in pane 66 was stained with H&E. But only those stained glands are used to determine the Gleason score that fall within a scoring region determined using co-registered images of tissue stained with p63 and CK18. A pane 67 at the lower left of the screenshot of FIG. 16 shows a digital image of the tissue that was stained with CK18.

As explained above, method 31 can also be used to obtain improved histopathological scores relating to tissue other than prostate tissue. For example, an improved Allred score relating to breast tissue can be obtained by defining gland objects that are likely to be cancerous using method 31. The Allred score is indicative of breast cancer. The Allred score ranges from 0-8 and indicates the percentage of cells in a region that have been stained to a certain intensity by the estrogen receptor (ER) antibody. Thus, the Allred score is the composite of a proportion score and an intensity score. An Allred score of three or more indicates ER positivity and can correspond to as few as 1% of the cells in the region showing a weak immunostaining signal. The image analysis program of system 10 calculates the Allred score by determining a scoring region using two stains, such as p63 and CK18, and then performing Allred scoring only in the scoring region based on breast tissue stained with ER. The image analysis program calculates the Allred score by segmenting cell objects and then determining the average intensity of the staining color in the pixels within the particular cell objects in the scoring region.

FIGS. 18A-C illustrate steps of method 31 being performed on digital images of breast tissue to obtain an improved Allred score. The breast tissue is typically obtained from a needle biopsy. FIG. 18A illustrates step 25, in which system 10 generates first objects 68 from a first digital image of a slice of breast tissue. The breast tissue has been stained with a first stain, such as tumor protein p63, that stains basal epithelial cells 69. Tumor protein p63 stains the nuclei of the basal epithelial cells 69 in the glands of healthy breast tissue.

In step 25, pixels having the color and intensity imparted by the dye attached to the p63 antibody are linked to objects that correspond to the stained basal epithelial cells 69. The first objects 68 are highlighted and superimposed over the first digital image.

FIG. 18B illustrates step 26 of method 31, in which system 10 generates second objects 70 from a second digital image of a second slice of the breast tissue. The second tissue slice has been stained with a second stain, such as CK18, that stains luminal epithelial cells 71. In FIG. 18B, the second objects 70 that are generated from the stained luminal epithelial cells 71 are highlighted and superimposed over the second digital image. Luminal epithelial cells express CK18 regardless of whether the luminal cells are surrounded by basal epithelial cells and a basal membrane, so the second objects 71 are also generated around clumps of luminal epithelial cells that lack an intact basal membrane and are no longer part of healthy glands. Then in step 27, the image analysis program co-registers the first digital image and the second digital image.

FIG. 18C shows the third objects 72 defined in step 28. The image analysis program defines third objects 72 that include only those second objects 70 that have more than a minimum separation from any of the first objects 68. Thus, the third objects 72 include all second objects 70 that are not adjacent to at least one first object 68. The third objects 72 represent aggregations of luminal epithelial cells that lack an intact basal membrane and are no longer part of a healthy gland of breast tissue. FIG. 18C also shows the scoring region 73 defined in step 29. The scoring region 73 is defined to include the third objects 72. In FIG. 18C, the scoring region 73 includes all areas that are not occupied by those second objects 70 that are not also third objects 72. The areas occupied in FIG. 18B by those second objects 70 that are not also third objects 72 are whited out in FIG. 18C and are not included in scoring region 73. So the scoring region 73 also includes the region of the stroma.

In step 30, an Allred score is determined based on a co-registered third digital image of a third slice of the breast tissue that has been stained with the estrogen receptor (ER) antibody. The Allred scoring is performed only in the scoring region 73 of the third digital image that contains cancerous glands of breast tissue. The image analysis program calculates the Allred score by segmenting cell objects in the scoring region 73 and then determining the average intensity of the staining color in the pixels within those cell objects.

The method 31 listed in FIG. 3 can also be performed on digital images of breast tissue to obtain an improved Elston-Ellis score. An Elston-Ellis score is a grade ranging from I-III indicative of the severity of breast cancer. A grade of III indicates the most aggressive cancer, whereas the tumor cells of grade I breast cancer are not dividing rapidly. The grade is determined by summing the points assigned to three parameters: tubule formation, nuclear pleomorphism and mitosis per region. A region of ten high-power fields (HPF) of 400× is often used in the Elston-Ellis test. Thus, in determining the Elston-Ellis score, the image analysis program divides the high resolution image into tile regions of ten HPF. However, within those tile regions only tissue falling within the scoring region is considered. Each of the parameters can have a point score ranging from 1-3 (1 being the best, and 3 being the worst). Thus, a sum of three results in a grade of I, whereas a sum of nine results in a grade of III. The image analysis program is able to determine the proportion of tubules, the similarity of nucleus sizes and the number of dividing cells within the scoring region.

Figure 19:
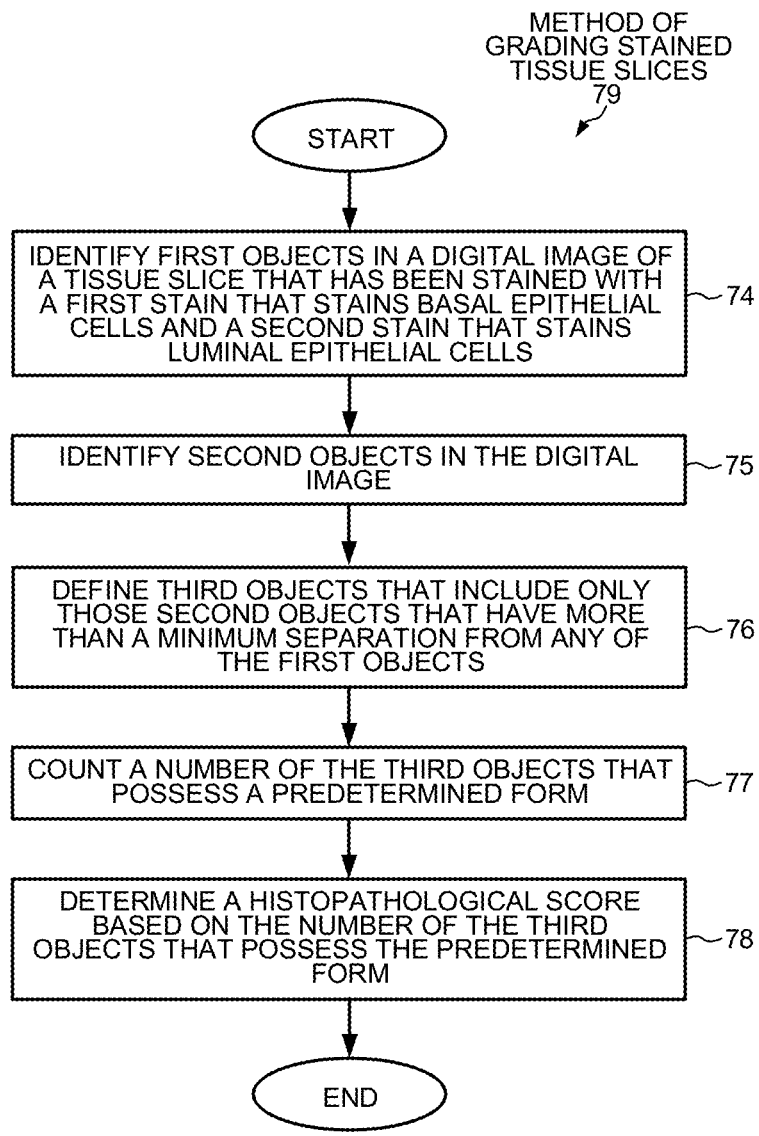
FIG. 19 is a flowchart of steps for obtaining an improved histopathological score based on an image of tissue that has been stained with both p63 and CK18.
Figure 20:
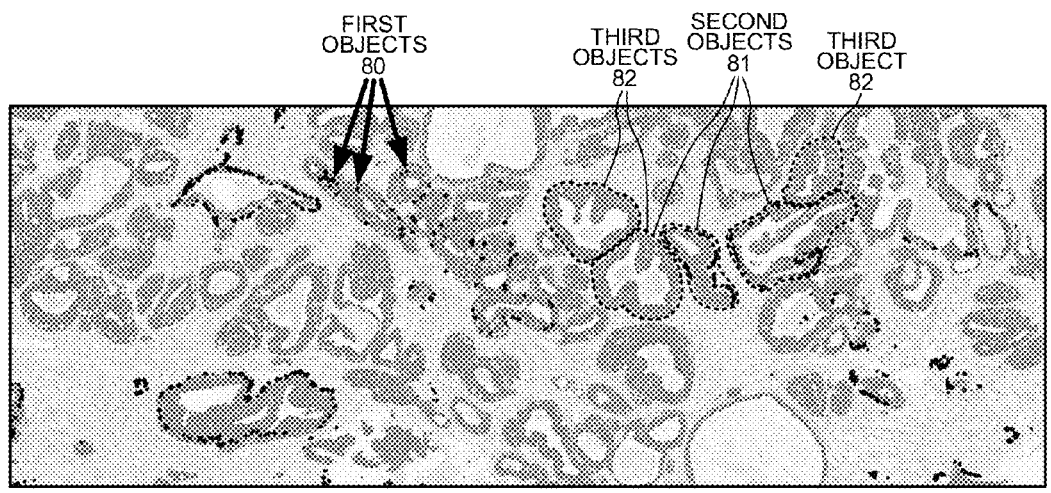
FIG. 20 illustrates steps of the method of FIG. 19 in which first and second objects are generated, and third objects are identified.
Figure 21:
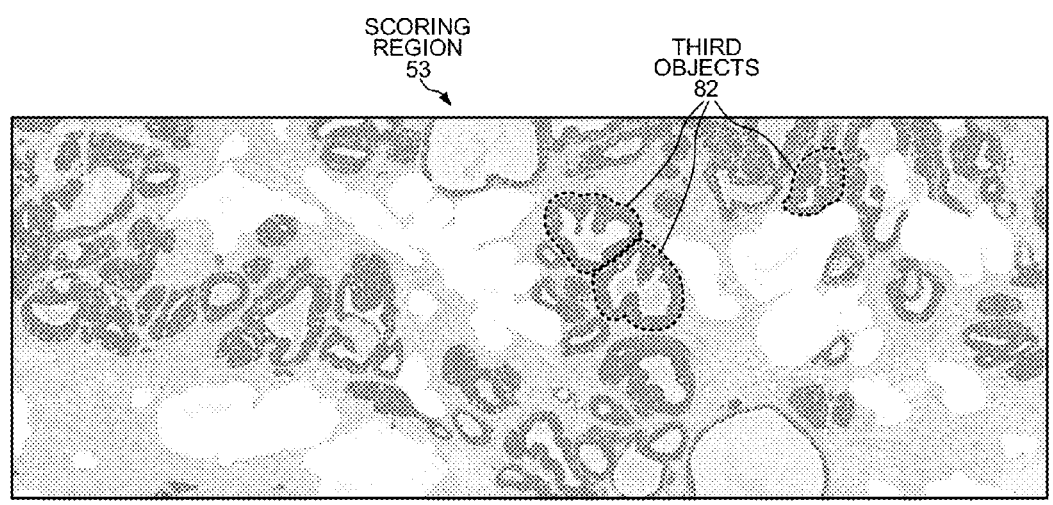
FIG. 21 shows the graphical user interface of the system of FIG. 1 in which second objects that are not also third objects have been removed from the digital image of tissue that has been stained with both p63 and CK18.

FIG. 19 is a flowchart of steps 74-78 of a method 79 of a third embodiment for obtaining an improved histopathological score. The steps of method 79 are illustrated by the images of FIGS. 20-21. As opposed to staining two separate slices of tissue and then co-registering the digital images of the two slices as in method 31, two biomarkers stain the same tissue slice in method 79. In the analysis of prostate tissue, a slice of a prostate biopsy sample is stained with both p63 and CK18. For example, the nuclei 33 of the basal epithelial cells 34 are stained blue with p63, and the luminal epithelial cells are stained red with CK18. Thus, method 79 does not require an image of tissue stained with p63 to be co-registered with a separate image of tissue stained with CK18.

Alternatively, a first stain can be used that directly stains the basal membrane 39 instead of immunohistochemical staining the nuclei 33 of the basal epithelial cells 34 that are in contact with the basal membrane 39. For example, stains for the basal membrane 39 include 92 kDa type IV collagenase and laminin staining of tissue pretreated with trypsin.

In a first step 74, system 10 identifies first objects 80 in the digital image of the tissue slice that has been stained with a first stain that stains basal epithelial cells and with a second stain that stains luminal epithelial cells. The tumor protein p63 is used as the first stain that stains basal epithelial cells by staining the nuclei inside basal epithelial cells. Cytokeratin 18 (CK18) is used as the second stain that stains the luminal cells of the prostate tissue. Where the basal membrane 39 is directly stained instead of staining the basal cells, the first objects are hollow loops the size of glands as opposed to objects the size of nuclei.

FIG. 20 shows the graphical user interface 15 of system 10 after the first objects 80 have been identified in step 74. In FIG. 20, the first objects 80 appear as black dots.

In step 75, system 10 identifies second objects 81 in the digital image of the tissue slice that have been stained with the second stain. In step 76, third objects 82 are defined that include only those second objects 81 that have more than a minimum separation from any of the first objects 80. Thus, the third objects 82 include all second objects 81 that are not adjacent to at least one of the first objects 80 (the black dots). The third objects 51 represent luminal epithelial cells that are separated by more than a minimum amount from any stained nucleus of a basal epithelial cell. So third objects 51 have more than a minimum separation from basal cells that are in contact with a basal membrane and, therefore, are no longer part of a healthy prostatic gland. In FIG. 20, two exemplary second objects 81 and three exemplary third objects 82 are encircled with dashed lines. One of the encircled objects belongs to both the class of second objects 81 and the class of third objects 82.

Where the basal membrane 39 is directly stained and the first objects are hollow loops the size of glands, the third objects 82 are defined in step 76 as including only those second objects 81 that have more than a minimum separation between the inner luminal cells and the surrounding loop of the stained basal membrane. For example, the third objects 82 include those second objects 81 that are not surrounded by the loop of a first object 80.

In step 77, system 10 counts the number of third objects 82 that possess a predetermined form. Each of the stained luminal epithelial cells that make up the third objects 51 belongs to one of the five sample Gleason patterns used to categorize the severity of prostatic adenocarcinoma in the biopsy tissue. System 10 classifies the third objects 82 into five predetermined forms based on the features of the objects. System 10 then concludes that the most prevalent Gleason pattern in the tissue slice corresponds to the predetermined form possessed by the largest number of third objects 82. For example, the image analysis program of system 10 determines the shape of each third object 82 based on asymmetry, elliptic fit, roundness and the fit to a shape index. For objects that are not round, the program counts the number of branches and sub-branches of the object. The program also measures the length, width and area of each of the third objects. The program determines the distance from each object to its nearest neighbor. And the program counts the number of all types of third objects 82 per unit area. These object features are then used to determine whether a particular third object possesses one of the five predetermined forms.

In step 78, a histopathological score such as a Gleason score is determined based in part on the number of the third objects 82 that possess the predetermined form. For example, if four hundred of the third objects 82 possess the predetermined form of Gleason pattern five, and two hundred of the third objects 82 possess the predetermined form of Gleason pattern four, then the Gleason score for the tissue slice is nine. FIG. 21 shows the graphical user interface 15 of system 10 in which second objects 81 that are not also third objects 82 have been removed from the digital image of the stained tissue. Thus, only the third objects 82 that were used to determine the histopathological score are displayed on the graphical user interface. The displayed image from which the second objects 81 that are not also third objects 82 have been removed constitutes the scoring region 53 in which the non-cancerous prostate glands have been whited out.

In the embodiment of method 31, the Gleason score is determined by classifying each subregion within the scoring region as belonging to one of the five Gleason tissue patterns based on the object features of the third objects in each subregion. The most prevalent Gleason pattern is the pattern assigned to the greatest number of subregions. Thus, the embodiment of method 31 determines the most prevalent Gleason pattern based on which pattern covers the largest area of the scoring region. In the embodiment of method 79, the Gleason score is determined based in part on the number of third objects that possess a predetermined form corresponding to one of the five Gleason patterns. Thus, the embodiment of method 79 determines the most prevalent Gleason pattern by counting types of third objects. An alternative embodiment combines the area aspect of method 31 with the counting aspect of method 79. The alternative embodiment determines a histopathological score by categorizing each third object into a class. For example, each object is classified according to the form or structure of glands associated with each Gleason pattern. Then the score is calculated based on the sum of the areas of the third objects that are categorized as belonging to each class. In one example, if some third objects have a form associated with Gleason pattern four, and other third objects have a form associated with Gleason pattern five, then the sum of the areas of the third objects associated with Gleason pattern four is compared to the sum of the areas of the third objects associated with Gleason pattern five. In this alternative embodiment, Gleason pattern five is the most prevalent pattern if the combined area of all pattern-five third objects is greater than the sum of the areas of the pattern-four third objects even if there are more pattern-four third objects than pattern-five third objects.

Data analysis server 14 includes a computer-readable storage medium having program instructions thereon for performing method 31 and method 79. Such a computer-readable storage medium can include instructions for generating objects in digital images that have been stained by a particular biomarker and for identifying and defining those objects based on object features.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    generating first objects from a first digital image of a first tissue slice, wherein the first tissue slice has been stained with a first stain that stains basal epithelial cells;
    generating second objects from a second digital image of a second tissue slice, wherein the second tissue slice has been stained with a second stain that stains luminal epithelial cells;
    co-registering the first digital image with the second digital image;
    defining third objects that include only those second objects that have more than a minimum separation from any of the first objects;
    displaying the third objects on a graphical user interface;
    defining a scoring region that includes the third objects; and
    determining a histopathological score in the scoring region.

2. The method of claim 1, wherein the histopathological score is determined based on tissue stained with the second stain.

3. The method of claim 1, wherein the first stain is transcription factor p63, and wherein the transcription factor p63 comprises a protein-specific antibody and an attached dye.

4. The method of claim 1, wherein the first stain stains basal epithelial cells by staining nuclei inside the basal epithelial cells.

5. The method of claim 1, wherein the first stain is transcription factor p63 and the second stain is cytokeratin 18 (CK18).

6. The method of claim 1, further comprising:
    co-registering the second digital image and a third digital image, wherein the third digital image is of a third tissue slice stained with a third stain;
    locating the scoring region on the third digital image; and
    generating fourth objects in the scoring region in the third digital image that have been stained with the third stain, wherein the histopathological score is determined based on tissue stained with the third stain.

7. The method of claim 6, wherein the third stain is hematoxylin and eosin (H&E).

8. The method of claim 1, wherein the histopathological score is taken from the group consisting of: a Gleason score, an Allred score, an Elston-Ellis score, an Her2 score, and a HercepTest score.

9. The method of claim 1, wherein the minimum separation is 150 microns.

10. The method of claim 1, wherein the defining the third objects involves growing the second objects by the minimum separation and excluding from the third objects those second objects that have grown into any of the first objects.

11. The method of claim 1, wherein the third objects are a subset of the second objects.

12. The method of claim 1, wherein the first tissue slice originated adjacent to the second tissue slice.

13. The method of claim 1, wherein the first tissue slice and the second tissue slice where adjacent to one another in a tissue sample.

14. The method of claim 13, wherein the tissue sample is a needle tissue sample.

15. The method of claim 1, wherein the co-registering is performed before the identifying the first objects.

16. A method comprising:
  segmenting a first digital image to generate first objects corresponding to tissue stained with a first stain, wherein the first stain stains basal membranes of the tissue;
  segmenting a second digital image to generate second objects corresponding to tissue stained with a second stain, wherein the second stain stains epithelial cells in the tissue;
  co-registering the first digital image and the second digital image; and
  displaying the second digital image on a graphical user interface with a subset of the second objects identified, wherein the subset of the second objects includes only those second objects that have at least a minimum separation from any of the first objects.

17. The method of claim 16, further comprising:
  determining a Gleason score based on the subset of the second objects.

18. The method of claim 17, wherein the determining the Gleason score is performed by counting a number of the second objects present in the subset of the second objects.

19. The method of claim 16, further comprising:
  classifying an area of the tissue that includes the subset of the second objects as belonging to a Gleason pattern.

20. The method of claim 16, wherein the second stain is cytokeratin 18 (CK18).

21. The method of claim 16, wherein the minimum separation is a number of pixels.

22. A method comprising:
  identifying first objects in a digital image of a tissue slice, wherein the tissue slice has been stained with a first stain that stains basal epithelial cells and with a second stain that stains luminal epithelial cells;
  identifying second objects in the digital image of the tissue slice;
  defining third objects that include only those second objects that have more than a minimum separation from any of the first objects;
  displaying the third objects on a graphical user interface;
  counting a number of the third objects that possess a predetermined form; and
  determining a histopathological score based in part on the number of the third objects that possess the predetermined form.

23. The method of claim 22, wherein the histopathological score is taken from the group consisting of: a Gleason score, an Allred score, an Elston-Ellis score, an Her2 score, and a HercepTest score.

24. The method of claim 22, wherein the first stain is cytokeratin 14 (CK14) and the second stain is cytokeratin 18 (CK18).

25. The method of claim 22, wherein the predetermined form is defined by an object feature taken from the group consisting of: length, width, area, asymmetry, elliptic fit, roundness, and number of branches.

* * * * *